Jan. 16, 1962   J. J. LOVINGHAM   3,016,695
REACTION MOTOR THRUST CHAMBER
Filed May 31, 1960   2 Sheets-Sheet 2
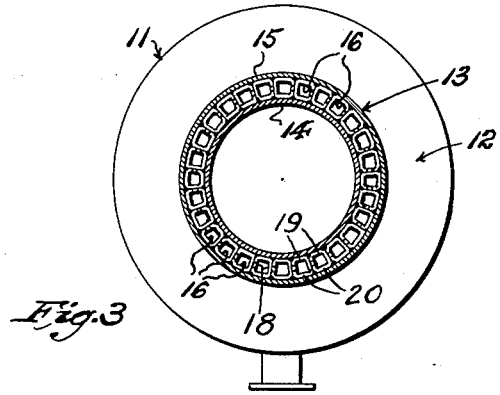
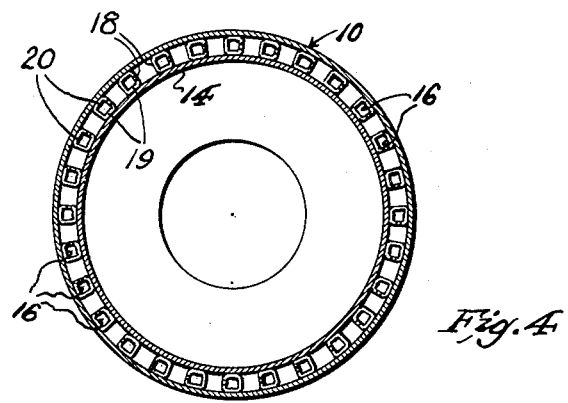
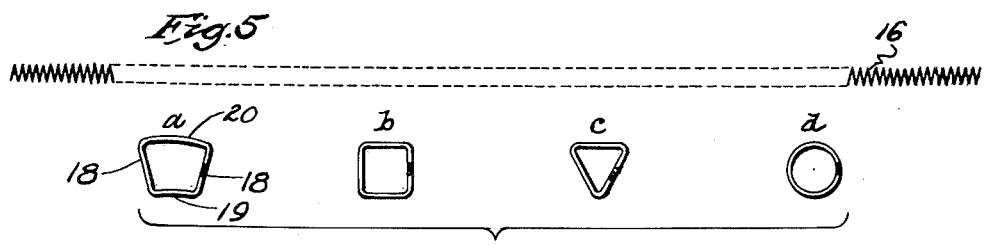
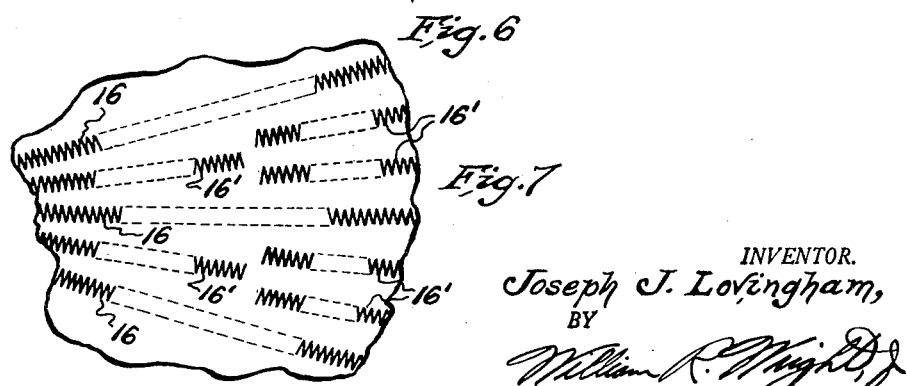
INVENTOR.
Joseph J. Lovingham,
BY
William R. Wright
AGENT United States Patent Office 3,016,695
Patented Jan. 16, 1962

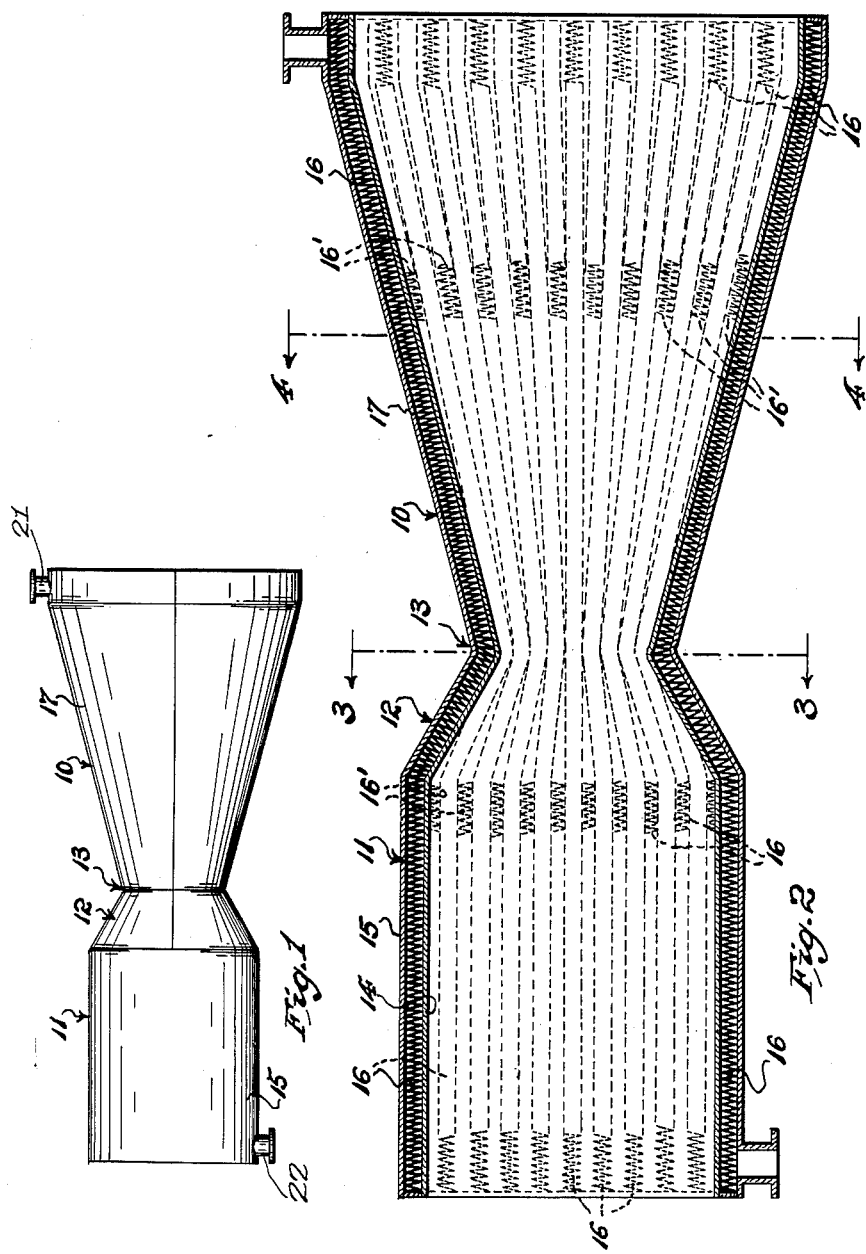

3,016,695
REACTION MOTOR THRUST CHAMBER
Joseph J. Lovingham, Madison, N.J., assignor to Thiokol Chemical Corporation, Bristol, Pa., a corporation of Delaware
Filed May 31, 1960, Ser. No. 32,737
15 Claims. (Cl. 60—35.6)

The present invention relates to heat exchanging devices and systems in general and has particular reference to heat exchange means embodied in the side walls of rocket motors and jet propulsion motors. Even more specifically, the invention refers to high-pressure high-temperature thrust chambers of rocket and jet propulsion motors that have side walls including comparatively thin coaxial inner and outer metallic shells with intermediate metallic tying members.

In the design of high-pressure high-temperature thrust chambers, two contradictory criteria are often encountered. For instance, while the heat transfer conditions usually dictate a reasonably thin wall to minimize gas side wall temperatures, which increase is about in proportion to wall thickness increase, the pressure loading conditions encountered at the high temperatures (where material yield strengths are reduced), usually require either a thick wall or an equivalent structure in which, in accordance with prior art practices, a thin inner chamber wall liner is attached by ribs, fins or other intermediate tying members to a comparatively cool outer shell. This latter expedient, however, introduces a problem of high temperatures beneath the attaching means, causes the generation of thermal stresses between the cool outer shell and the hot inner shell, and also introduces a fabrication problem.

It, therefore, is the primary object of my present invention to provide a novel thrust chamber construction which eases fabrication, obtains necessary structural strength, and satisfies heat transfer criteria.

To be more explicit, I employ the usual thin coaxial inner and outer shells but substitute longitudinally extending coils of very thin wire for the prior art intermediate tying members composed of highly stressed ribs or fins.

My new intermediate shell attaching means possesses numerous features advantageous to thrust chamber construction as enumerated below. (1) Tying members in the form of wire coils are extremely flexible and capable of being bent readily to follow irregular longitudinal contours such, for example, as those present in the currently conventional design of jet propulsion or rocket motor thrust chambers, wherein an upstream combustion chamber of contoured shape merges with a downstream body such as a convergent-divergent nozzle. Also, assembly with the inner and outer shells is readily achieved. (2) The use of a wire thickness less than the shell thickness insures the absence of "hot spots" beneath the wire and permits cooling of the shell beneath the wire to a temperature below that of the adjacent material by virtue of a "finning" effect of the wire. (3) The replacement of a small number of highly stressed intershell supporting tying members by a very great number of wires (in the coils) enables the use of brazing in an assembly which is not readily inspected. The multiplicity of wires renders the construction serviceable even with brazing efficiencies far below 100 percent. (4) The proposed structure will be more resistant to oscillatory loading since it is supported at an infinite number of locations by the wire coils. (5) The flexibility introduced between the inner and outer shells by means of attachment through the fine wire coils aids in minimizing thermally generated stresses arising from differential expansion of the hot inner shell.

Further objects, advantages and features of the invention will become apparent as the following specific description is read in connection with the accompanying drawings, in which:

FIGURE 1 is a side elevation of a jet propulsion thrust chamber constructed in accordance with the invention;

FIGURE 2 is a large scale axial sectional view of the same;

FIGURE 3 is a transverse section on line 3—3 of FIGURE 2;

FIGURE 4 is a similar view on line 4—4 of FIGURE 2;

FIGURE 5 is a diagrammatic side elevational view of one of the full length wire coils in straight condition preceding assembly with the shells as a tying member therefor;

FIGURE 6 is an exploded view of several wire coils of different cross-sectional forms; and FIGURE 7 is a fragmentary diagrammatic side elevation of the inner shell showing a suggested arrangement of main tying members and abbreviated complementary tying members in the intervals between the former in the nozzle section of the thrust chamber.

Referring now in detail to the drawing, wherein like reference characters designate corresponding parts in the several views, it will be observed that I have chosen the thrust chamber of a rocket or jet propulsion motor as the illustrative embodiment of my improved heat exchanging device or system although the invention has numerous other practical applications.

In the illustrative application, thrust chamber 10 is of conventional longitudinal contour to include a substantially cylindrical combustion chamber section 11 (though my invention is applicable to any contoured chamber surface) and a convergent-divergent nozzle section 12 having a constricted throat 13. The thrust chamber 10 includes respective inner and outer sheet metal shells 14 and 15 of suitable thinness to meet the heat transfer conditions which may be encountered in operation of a high-pressure high-temperature chamber. These shells 14 and 15 are supported in coaxial relation by intermediate tying members which constitute the principal point of novelty of my invention and include a main set of longitudinally continuous tying members 16 that are coextensive with the entire length of thrust chamber 10 and a complementary set of tying members 16' of abbreviated length and of a suitable width to fill in the circumferential intervals between main tie members 16 in the larger diameter sections, such as combustion chamber section 11 and the divergent exhaust portion 17 of nozzle section 12, and thereby provide uniform radial support in all areas.

For convenience of reference in relation to the respective components of any specific heat exchanger organization, inner shell 14, which is directly exposed to the hot combustion gases, will be termed the "primary heat exchange element" and the more remote outer shell 15 will be known as the "secondary heat exchange element."

Each of the new tying members 16—16' is a coil of wire of appropriate length and diameter or gage to fill the annular space between inner shell 14 and outer shell 15. The wire of which each coil is formed should be of a diameter smaller than the thickness of the respective shells 14 and 15 to insure the absence of "hot spots" beneath the wire and to permit cooling the shell beneath the wire to a temperature below that of the adjacent material by virtue of a "finning" effect of the wire, as previously explained.

The cross-sectional form of each wire coil tying member 16 or 16' may be circular as in standard coil springs (FIGURE 6d) but the generally square form shown in FIGURE 6b of the drawing affords desired rigidity of support. However, I presently prefer the trapezoidal form shown in FIGURES 3, 4 and 6a, wherein the side portions 18 of each convolution are straight and substantially radially extending with respect to the thrust chamber axis whereas the inner cross portion 19 and outer cross portion 20 are slightly curved to conform to the curvature of the adjacent surfaces of the respective inner and outer shells 14 and 15 so as to be in even abutment against the later to facilitate brazed joints as well as rigidity. Selection of the triangular form shown in FIGURE 6c will permit disposition of apices in abutment against the inner shell (not shown) in a manner to minimize hot spots.

A presently preferred choice of the number of continuous thrust chamber-coextensive main wire coil tying members 16 is that number which will result in tangential abutment of said coils at the minimum diameter or throat 13 of the nozzle section. As previously explained, the intervals between the more widely spaced lengths of the main wire coil tying members 16 at positions where the shell diameters are greater than the throat minimum are filled by partial length complementary tying members 16', which may be of the trapezoidal cross-section shown or of any other geometry, proportion or shape that may be substituted.

To insure rigid coherence of the complete structure, the abutting surfaces of the wire coil tying members and shells are secured together by brazing preferably, but it is within the spirit of the invention to utilize any equivalent securing means.

In the thrust chamber construction just described the wire coil tying members are well suited to serve as laterally permeable channeling means tending to prevent turbulence and produce axial flow of coolant fluid, which may be one of the propellants (such as liquid jet fuel or hydrogen) in a regenerative system or any other fluid which may be desired. To control the circulation of coolant fluid through the coils, respective inlet and outlet manifolds 21 and 22 are shown as being provided at appropriate ends of thrust chamber 10 in communication with the space between shells 14 and 15.

While there have been shown and described and pointed out the fundamental novel features of this invention as applied to a single structural embodiment, it will be understood that various omissions and substitutions and changes in the form and details of the device illustrated may be made by those skilled in the art without departing from the spirit of the invention. It is the intention, therefore, to be limited only as indicated by the scope of the following claims.

I claim:

1. A thrust chamber for jet propulsion motors comprising, inner and outer coextensive coaxial shells conforming to the longitudinal contour of such a chamber to include a combustion chamber and a nozzle, said shells being sufficiently different in their respective diameters to provide an annular space therebetween, the intermediate main tying members fitted into the space between the shells and being in the form of plural longitudinally extending wire coils of cross-sectional outside diameter substantially equaling the radial spacing between shells.

2. A thrust chamber as defined in claim 1, to which is added means to secure contiguous portions of the tying members and shells rigidly together.

3. A thrust chamber as defined in claim 2, wherein the securing means is a brazed joint.

4. A thrust chamber as defined in claim 1, wherein the wire coils which constitute the tying members are substantially trapezoidal in cross-section and arranged with their short side portions substantially radially extending with respect to the thrust chamber axis, and wherein the inner and outer cross portions of the wire coils are inwardly concave and outwardly convex to conform substantially in peripheral contour to the contiguous surfaces of the respective inner and outer shells.

5. A thrust chamber as defined in claim 1, wherein the wire coils which constitute the respective main tying members are substantially coextensive with the said inner and outer shells and of uniform diameter throughout their length, and wherein that diameter and the number of tying members is such that adjacent tying members are in tangential abutment at the throat of the chamber nozzle.

6. A thrust chamber as defined in claim 1, wherein additional comparatively short complementary tying member sections are fitted in longitudinally extending positions in the available spaces between the full length main tying members in the regions of the combustion chamber and nozzle remote from the nozzle throat.

7. A thrust chamber as defined in claim 1, wherein the diameter of the wire from which the tying member coils are made is less than the thickness of each shell.

8. A thrust chamber as defined in claim 1, to which is added inlet and outlet manifolds at opposite ends of the thrust chamber in connection with the inner and outer shells to direct passage of coolant fluid into the laterally permeable longitudinal channeling means constituted by the tying member coils.

9. A thrust chamber as defined in claim 1, wherein the wire coils which constitute the tying members are substantially circular in cross-section.

10. A thrust chamber as defined in claim 1, wherein the wire coils which constitute the tying members are substantially square in cross-section.

11. A thrust chamber as defined in claim 1, wherein the wire coils which constitute the tying members are triangular in cross-section and arranged with apices thereof abutting the inner shell.

12. A heat exchanging device comprising, respective coaxial tubular primary heat exchange elements of different diameters to provide an annular space therebetween, and plural heat conducting members fitting said annular space in abutting relation to both primary elements, said heat conducting members being in the form of axially extending wire coils.

13. A heat exchanging device as defined in claim 12, wherein the opposed faces of the coaxial primary elements are axially undulating and parallel and the wire coils are bent axially to follow the undulations of said elements.

14. A heat exchanging device as defined in claim 12, wherein the primary elements are thin walled and the heat conducting members are made of coils of wire of smaller diameter than the radial wall thickness of each primary element.

15. The invention defined in claim 12, to which is added means to conduct coolant fluid into the longitudinal channeling means provided by the wire coils constituting the heat conducting member.

References Cited in the file of this patent

UNITED STATES PATENTS

| | | |
|---|---|---|
| 2,943,442 | Baehr | July 5, 1960 |
| 2,958,183 | Singelmann | Nov. 1, 1960 |

FOREIGN PATENTS

| | | |
|---|---|---|
| 459,924 | Great Britain | Jan. 18, 1937 |

UNITED STATES PATENT OFFICE
CERTIFICATE OF CORRECTION

Patent No. 3,016,695                                        January 16, 1962

Joseph J. Lovingham

It is hereby certified that error appears in the above numbered patent requiring correction and that the said Letters Patent should read as corrected below.

Column 3, line 61, for "the" read -- and --.

Signed and sealed this 15th day of May 1962.

(SEAL)
Attest:

ERNEST W. SWIDER                                      DAVID L. LADD
Attesting Officer                                          Commissioner of Patents